US009010188B2

(12) United States Patent
Tustaniwskyj et al.

(10) Patent No.: US 9,010,188 B2
(45) Date of Patent: Apr. 21, 2015

(54) SYSTEM AND METHOD FOR ACCELERATING A DEVICE

(75) Inventors: Jerry Ihor Tustaniwskyj, Mission Viejo, CA (US); Alexander Josef Waldauf, Kufstein (AT); James Wittman Babcock, Escondido, CA (US)

(73) Assignee: Delta Design, Inc., Poway, CA (US)

( * ) Notice: Subject to any disclaimer, the term of this patent is extended or adjusted under 35 U.S.C. 154(b) by 676 days.

(21) Appl. No.: 13/091,995

(22) Filed: Apr. 21, 2011

(65) Prior Publication Data

US 2012/0103094 A1    May 3, 2012

Related U.S. Application Data

(60) Provisional application No. 61/326,565, filed on Apr. 21, 2010.

(51) Int. Cl.
*B06B 3/00* (2006.01)
*G01P 21/00* (2006.01)
*G01M 7/02* (2006.01)
*G01M 7/04* (2006.01)

(52) U.S. Cl.
CPC ............... *G01P 21/00* (2013.01); *G01M 7/022* (2013.01); *G01M 7/025* (2013.01); *G01M 7/04* (2013.01)

(58) Field of Classification Search
CPC ...... G01M 74/04; G01M 7/022; G01M 7/025
USPC ............... 73/514.29, 493, 509, 662, 663, 666
See application file for complete search history.

(56) References Cited

U.S. PATENT DOCUMENTS

| 2,706,400 | A | * | 4/1955 | Unholtz | 73/666 |
| 2,890,584 | A | * | 6/1959 | Dickie | 73/665 |
| 4,180,766 | A | * | 12/1979 | Matula | 318/128 |
| 4,428,238 | A | * | 1/1984 | Tauscher | 73/663 |
| 4,633,716 | A | * | 1/1987 | Martin | 73/663 |
| 4,641,725 | A | * | 2/1987 | Cole et al. | 181/119 |
| 5,128,908 | A | * | 7/1992 | Reust | 367/190 |

(Continued)

OTHER PUBLICATIONS

Thomson, William T.; 3.6 Vibration Isolation; Theory of Vibration with Applications, 2$^{nd}$ Edition; 1981; pp. 64-68; Prentice-Hall, Inc., USA.

(Continued)

*Primary Examiner* — Laura Martin
*Assistant Examiner* — Samir M Shah
(74) *Attorney, Agent, or Firm* — Foley & Lardner LLP

(57) ABSTRACT

An acceleration device includes an actuator configured to displace a mass in a reciprocating motion at a desired frequency, a mount configured to hold a device, such as an accelerometer device, and at least one spring connecting the mount to the mass. The actuator is used to apply a force to achieve resonance. The actuator may comprise a voice coil motor, wherein the voice coil motor includes a permanent magnet and an armature and wherein said armature comprises part of said mass. The actuator applies a periodic force to the mass. The periodic force may be a sinusoidal force. Preferably, the applied force is aligned with a resulting velocity of the mass. The mount may include a test socket to which the device is electrically connected. The spring may comprises one or more flexure elements. The acceleration device may be used with a handler device to connect and disconnect the device to and from the mount. Optionally, the handler device includes an environmental chamber surrounding the mount.

26 Claims, 13 Drawing Sheets

(56) References Cited

U.S. PATENT DOCUMENTS

| | | | |
|---|---|---|---|
| 5,343,752 A * | 9/1994 | Woyski et al. | 73/665 |
| 5,644,083 A * | 7/1997 | Newell et al. | 73/514.29 |
| 5,804,732 A * | 9/1998 | Wetzel et al. | 73/663 |
| 5,877,432 A * | 3/1999 | Hartman et al. | 73/862.69 |
| 6,619,121 B1 * | 9/2003 | Stewart et al. | 73/504.02 |
| 6,904,807 B1 * | 6/2005 | Butts | 73/662 |
| 7,487,680 B2 * | 2/2009 | Hammond et al. | 73/663 |
| 7,548,081 B1 * | 6/2009 | Cortright et al. | 324/750.05 |
| 7,683,608 B2 * | 3/2010 | Kiermeier et al. | 324/756.01 |
| 7,721,608 B2 * | 5/2010 | Henderson et al. | 73/663 |
| 8,079,267 B2 * | 12/2011 | Henderson et al. | 73/663 |
| 2004/0031648 A1 * | 2/2004 | Rasmussen | 185/11 |
| 2008/0034876 A1 | 2/2008 | Crowson, II | |
| 2009/0031810 A1 * | 2/2009 | Henderson et al. | 73/571 |

OTHER PUBLICATIONS

Thomson, William T.; 5.3 Forced Harmonic Vibration; Theory of Vibration with Applications, $2^{nd}$ Edition; 1981; pp. 143-145; Prentice-Hall, Inc., USA.

International Search Report; Application No. PCT/US2011/033452; issued Jul. 1, 2011; 5 pages.

* cited by examiner

SYSTEM AND METHOD FOR ACCELERATING A DEVICE

CROSS-REFERENCE TO RELATED PATENT APPLICATIONS

This application claims the benefit of U.S. Provisional Application No. 61/326,565, filed Apr. 21, 2010, which is incorporated herein by reference in its entirety.

FIELD

The disclosed embodiments relate generally to a system and method for accelerating a device under test, and more particularly, to highly accelerating a MEMS accelerometer.

BACKGROUND

Generally, a handler device is used to receive devices, such as integrated circuit (IC) devices, present such devices to a test apparatus, and remove the devices after testing. In such an environment, the IC devices may be referred to as devices under test or "DUTs." Tested devices may be sorted based on the results of the testing. Based on the results of a test, the devices may also be calibrated by burning fuses inside them.

Testing may be performed under a range of conditions. In some such cases, the DUTs may be placed within an environmental chamber in which temperature, humidity, and/or other conditions may be controlled.

Certain applications present particular challenges. For example, many modern accelerometers are micro electromechanical systems (MEMS) devices which are capable of detecting acceleration up to very high ranges, well in excess of fifty times the acceleration of gravity (i.e., greater than 50 g). In order to fully test these devices, it is necessary to subject the MEMS devices to such accelerations in a controlled manner, while the MEMS devices are operating, and to review the measurements provided by the MEMS devices.

U.S. Pat. No. 7,683,608 describes a handler for acceleration testing of electronic components. An acceleration device is disclosed in which a DUT is held on a nest that is attached to the free end of a tappet. The other end of the tappet is connected to a coil motor that moves the tappet back and forth in an axial direction at a certain frequency. One drawback of such system is that a large force is required to accelerate the DUT, nest, and tappet at sufficiently high levels. Accordingly, the motor must be large enough to generate such a force, requiring a large amount of energy. Further, generation of the large force results in high levels of stress on the motor, possibly hastening wear and reducing the life of the motor. Such a system may also be incapable of functioning properly when placed in an environmental chamber. These constraints impose practical limitations on the level of acceleration that can be achieved and the overall durability of the system.

Another method of testing accelerometers utilizes controlled impact. With this method, a device at a set velocity undergoes an impact with a hard surface or spring. This method can produce high acceleration magnitudes, but may give an erratic acceleration profile, may not be sufficiently repeatable, and may not produce a profile with a sufficiently long period to fully characterize a device.

Yet another method involves mounting devices onto a rotating drum and having the acceleration obtained from the centrifugal forces on the devices. This method still requires a large torque and becomes cumbersome if testing needs to be performed at different levels and in both the positive and negative direction.

It would be advantageous to provide an acceleration device for a handler system capable of accelerating a device to high levels in a controlled, energy-efficient, repeatable manner.

SUMMARY

According to an embodiment of the invention, an acceleration device includes an actuator configured to displace a mass in a reciprocating motion at a desired frequency, a mount configured to hold a device, such as an accelerometer, and at least one spring connecting the mount to the mass. The actuator is used to apply a force to achieve resonance.

The actuator may include a voice coil motor, where the voice coil motor includes a permanent magnet and an armature and where the armature includes part of the mass.

According to an aspect of the invention, the actuator applies a periodic force to a mass. The periodic force may be a sinusoidal force. Preferably, the applied force is aligned with a resulting velocity of the mass.

According to an aspect of the invention, the mount includes a test socket to which the device is electrically connected.

In another embodiment, the mass is further coupled to a fixed surface by at least one spring, such as one or more flexure elements.

In certain embodiments, the acceleration device further includes a handler device to connect and disconnect the device to and from the mount. Optionally, the handler device includes a chamber surrounding the mount, wherein the conditions of the chamber are controlled, the conditions including at least one of temperature and humidity.

According to another embodiment of the invention, a method of accelerating a device includes placing a device on a mount, where the mount is coupled to a mass via at least one flexure, and applying a periodic force to the mass with an actuator to displace the mass in a reciprocating motion at a desired frequency.

BRIEF DESCRIPTION OF THE DRAWINGS

These and other features, aspects, and advantages of the disclosed embodiments will become apparent from the following description, appended claims, and the accompanying exemplary embodiments shown in the drawings, which are briefly described below.

DETAILED DESCRIPTION OF THE PREFERRED EMBODIMENTS

Figure 1:
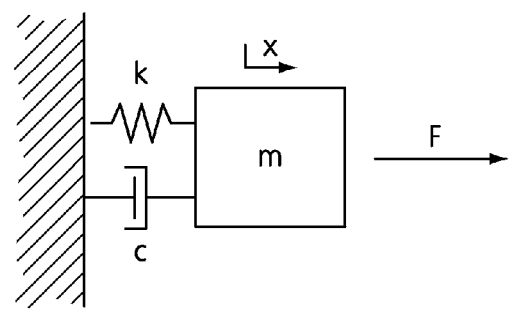
FIG. 1 is a dynamic representation of a system including a fixture with a spring and damper attached.

The large magnitude of force necessary to accelerate a device at high levels of acceleration is evident from the following example provided for context. Consider a mass m to be accelerated to 200 times the acceleration of gravity g (i.e., g is about 9.81 m/s$^2$). The force F in Newtons required would be about 1961 m/s$^2$ times the mass m in kilograms. The following Table 1 illustrates the forces required to accelerate masses in a range of 0.5 to 10.0 kg (i.e., roughly 1 to 20 pounds).

TABLE 1

| m (kg) | F (N) @ 200 g |
|---|---|
| 0.5 | 980.7 |
| 1.0 | 1,961.3 |
| 1.5 | 2,942.0 |
| 2.0 | 3,922.7 |
| 2.5 | 4,903.3 |
| 3.0 | 5,884.0 |
| 3.5 | 6,864.7 |
| 4.0 | 7,845.3 |
| 4.5 | 8,826.0 |
| 5.0 | 9,806.7 |
| 6.0 | 11,768.0 |
| 7.0 | 13,729.3 |
| 8.0 | 15,690.6 |
| 9.0 | 17,652.0 |
| 10.0 | 19,613.3 |

As shown by Table 1, the force required on the mass m, which may include a test fixture, is very large. Accordingly it would be advantageous to minimize the moving mass m including both the fixture and DUT. The DUT, particularly if the DUT is a MEMS or like-sized item, may have mass that is significantly less than the fixture, sockets, etc. Even if the system involved multiple MEMS devices under test at the same time, the combined mass of the DUTs may be significantly less than the associated fixture.

In some applications, it may be desirable to not only subject a DUT to high acceleration, but also to test a DUT over multiple frequencies of oscillatory motion (e.g., periodic motion, harmonic motion). The following equation provides the amplitude of displacement x as a function of acceleration $\ddot{x}$ and angular frequency ω (e.g., circular frequency, angular speed, two π times the frequency f in hertz) for a single degree-of-freedom system including a mass, such as the mass of the fixture holding the DUT, coupled to a "massless" spring, in turn coupled to a fixed body, where the system is in simple harmonic motion (e.g., sinusoidal motion):

$$x = \frac{\ddot{x}}{\omega^2} = \frac{200\ g}{\omega^2} \quad \text{(Eq. 1)}$$

Vibrating with a maximum acceleration $\ddot{x}$ of 200 g toward the at-rest position of the mass, the following table provides a range of amplitudes of displacement x as a function of frequency f in Hertz.

TABLE 2

| f (Hz) | x (mm) @ 200 g |
|---|---|
| 50 | 19.87 |
| 100 | 4.97 |
| 200 | 1.24 |
| 300 | 0.55 |
| 400 | 0.31 |
| 500 | 0.20 |

In accordance with one aspect of the invention, the amount of force required to excite a mass of a system, which may include a fixture, sensors, a DUT, etc., is reduced by attaching a spring to the mass and exciting the system at a resonant frequency of the system. Purposely exciting a system to induce resonance may be counterintuitive to structural engineers, because resonance is typically avoided in structural design due to the associated enhancement of vibrations, which may be destructive to some systems (e.g., Tacoma Narrows Bridge). However in some embodiments disclosed herein, resonance of systems are purposely induced and used to provide for efficiently testing MEMS-accelerometers at high accelerations, on the order of 50 to 200 g, or even greater accelerations.

FIG. 1 is a representation of a dynamic system including a mass m (which may be quantified in terms of kg units) with a spring attached between the mass and a fixed body. According to an exemplary embodiment, the mass may include a test fixture to which may be mounted a device (e.g., DUT, MEMS accelerometer, micro-device) to be subject to acceleration by application of a force F (which may be quantified in terms of N units). While FIG. 1 is simplified, the features attributed to the system of FIG. 1, such as control of the acceleration of the mass, are applicable to other embodiments disclosed herein.

For purposes of example, the spring of FIG. 1 is assumed to have negligible mass and a linear force-deflection relationship according to Hooke's law, with a constant spring rate k, which may be quantified in terms of N/m units. Further, the mass is assumed to be lumped (e.g., concentrated at a single point). Movement of the spring is limited to a single degree of freedom in the form of translation in a direction (e.g., x-direction). System damping is represented as a linear dashpot with damping coefficient c, which may be quantified in terms of N/m/s units. It is desirable to reduce damping to get an increased efficiency and amplification. The influence of drag, friction, and other losses are assumed negligible. The equation of motion for this system is:

$$m\ddot{x}+c\dot{x}+kx=F(t), \quad \text{(Eq. 3)}$$

where $\dot{x}$ is velocity, and F(t) is the driving force as a function of time. Or alternatively:

$$\ddot{x} + 2\zeta\omega_n\dot{x} + \omega_n^2 x = \frac{F(t)}{m}, \quad \text{(Eq. 4)}$$

where $\zeta$ is the non-dimensional damping factor (e.g., damping ratio, damping coefficient c divided by twice the root of the product of k and m) and $\omega_n$ is the natural frequency (rad/s). When damping is negligible, the natural frequency is approximately the resonant frequency of the system, where the system readily transfers energy between kinetic and potential energy modes.

Figure 2:
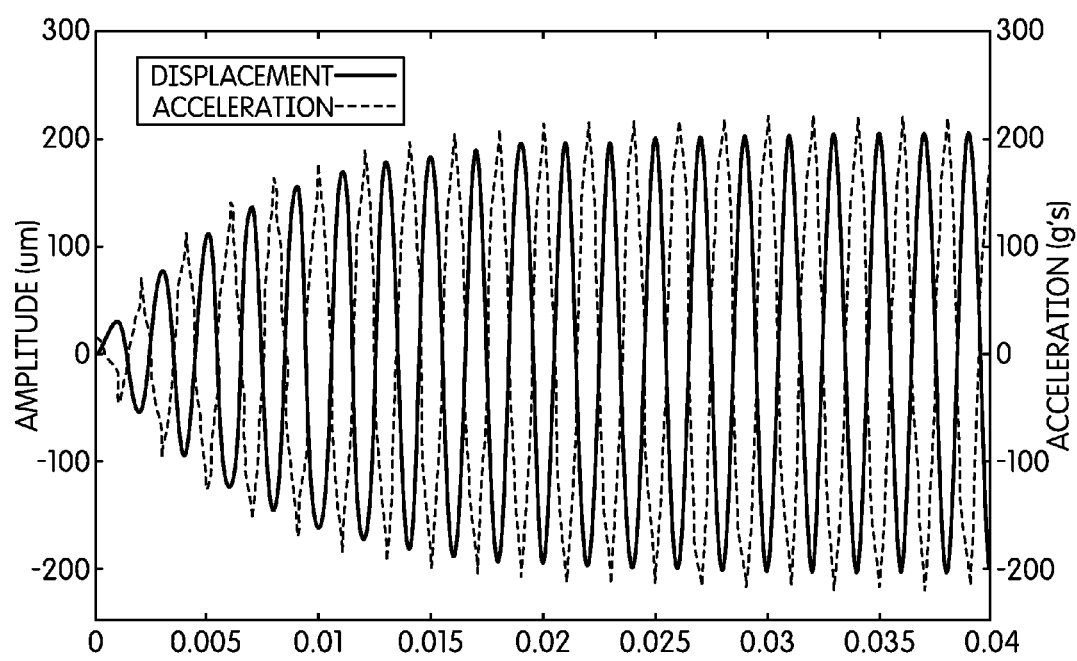
FIG. 2 is a graph showing the results of a numerical simulation of the system of FIG. 1 at resonance.

For purposes of context, FIG. 2 is a graph of a numerical simulation showing excitation of the system of FIG. 1 at resonance based on the following assumptions:

$$\omega_n = 3142 \text{ rad/s},$$

$$\zeta = 0.05,$$

$$\frac{F(t)}{m} = 160 \text{ N/kg if } \dot{x} \geq 0, \text{ and}$$

$$\frac{F(t)}{m} = -160 \text{ N/kg if } \dot{x} < 0.$$

As such, the driving force F(t) is aligned with the velocity vector to excite the system.

Figure 16:
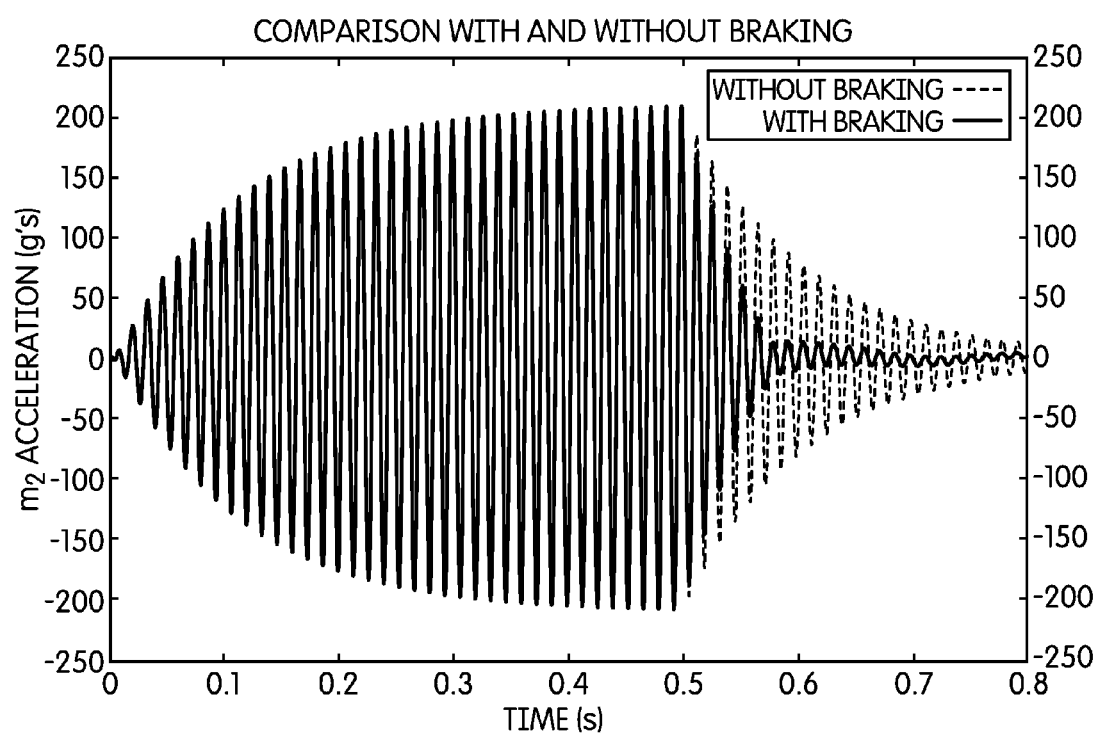
FIG. 16 is a graph showing the results of a numerical simulation of the system of FIG. 5 braking

In some embodiments, the driving force F(t) may be directed opposite to the velocity vector to quickly brake the system, so as to allow for fast substitution of DUTs between tests. FIG. 16 compares the response of the system with braking by applying the force F(t) opposite to the velocity vector, and without active braking. As with the algorithm applying the driving force to achieve resonance, in other embodiments different braking algorithms may be used.

Due to factors such as frictional losses, spring mass, elasticity of the mass (e.g., fixture), imprecise dimensions (e.g., limited tolerances), and other factors within components of a real-world system, it may be difficult to predict the resonant frequency based only on vibration theory. However, calculation of the natural frequency of an idealized version of the real-world system according to vibration theory may be used to provide a ballpark estimate of the resonant frequency. Then, if one monitors velocity and controls the direction of the driving force F(t) so as to be aligned with velocity $\dot{x}$, one can excite the resonant frequency $\omega_n$ of the real world system without knowing the exact value. Further, if the resonant frequency changes, due to changes in mass, spring conditions, etc., the algorithm of aligning the excitation force with the velocity vector automatically compensates for the change.

The results of the simulation shown in FIG. 2 indicated that the excitation force required to achieve the associated accelerations in the system of FIG. 1 in resonance is significantly less than the force required without resonance, as shown in Table 1. Specifically, with the assumptions of the model given above (e.g., $\zeta=0.05$), the excitation force required is less than 1/10th the amount of force for the non-resonating example.

In some embodiments of a system according to FIG. 1, the system may be excited by applying a sinusoidal force F(t) on m. The bandwidth for achieving resonance, however, is narrow in such an embodiment. Accordingly, it may be preferable to track velocity.

Figure 3:
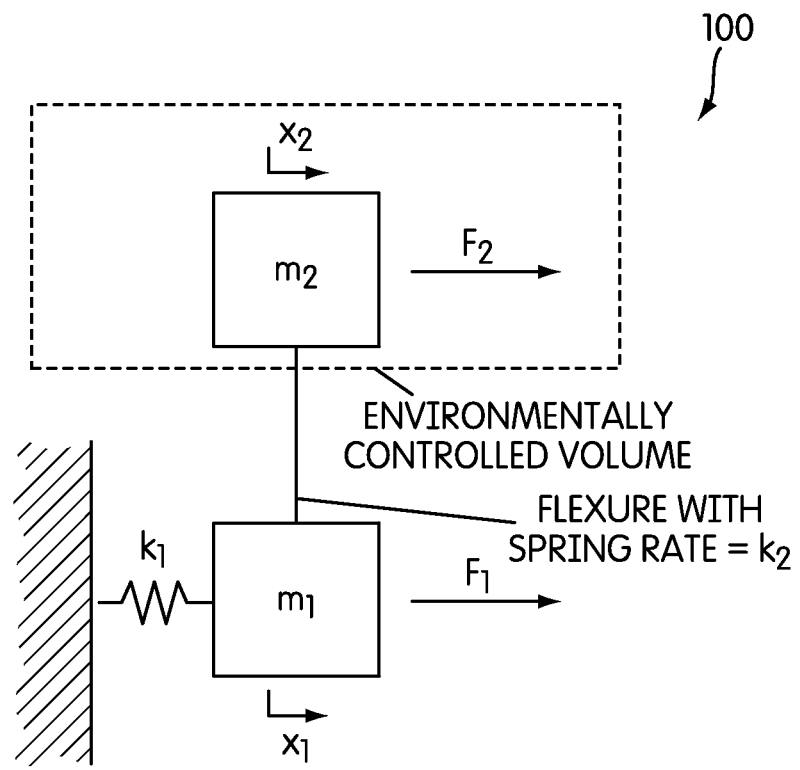
FIG. 3 is a dynamic representation of a system including a fixture connected by a flexure to a mass having a spring attached.

FIG. 3 illustrates a system according to another embodiment of the invention. Again, the system is simplified for context, but includes features of other embodiments disclosed herein. In FIG. 3, a mass $m_2$ represents the mass of fixture and a device (and possibly multiple test devices), such as a DUT as it would be affixed to a mount, such as a test socket. Mass $m_1$ represents the mass of another apparatus of the system to which the $m_2$ is coupled via a flexure (e.g., beam, arrangement of beams, spring). According to an exemplary embodiment, mass $m_1$ includes moving parts of the motor (e.g., voice coil, solenoid, stepper motor, tappet). In contrast with techniques in which a fixture is excited directly, requiring moving parts of the motor to be directly connected to the fixture carrying the DUT—in the embodiment of FIG. 3, the mass $m_1$, including the motor, is separated from the mass $m_2$, including the fixture.

As illustrated in FIG. 3, the mass $m_2$ is contained in an environmental chamber, for example an environmental chamber associated with a handler device used to control conditions such as temperature, humidity, etc. experienced by the DUT during testing. The configuration of FIG. 3 simplifies the assembly for environmentally-controlled tests by putting within the environmental chamber only those components that need to be inside the chamber for environmentally-controlled testing. In some embodiments, this may allow sensitive components, such as a motor, to reside outside the possibly harsh conditions within the environmental chamber.

According to an exemplary embodiment, an environmental chamber may surround or contain mass $m_2$ and not other parts of the system. Accordingly, with a smaller, more concentrated volume of the environmental chamber, the environmental chamber may be more responsive to changes in test parameters (e.g., temperature, humidity, gas composition, light), than would a larger environmental chamber. Furthermore, less energy resources may be used to control conditions in the environmental chamber, relative to a larger environmental chamber enveloping the entire system.

Figure 8:
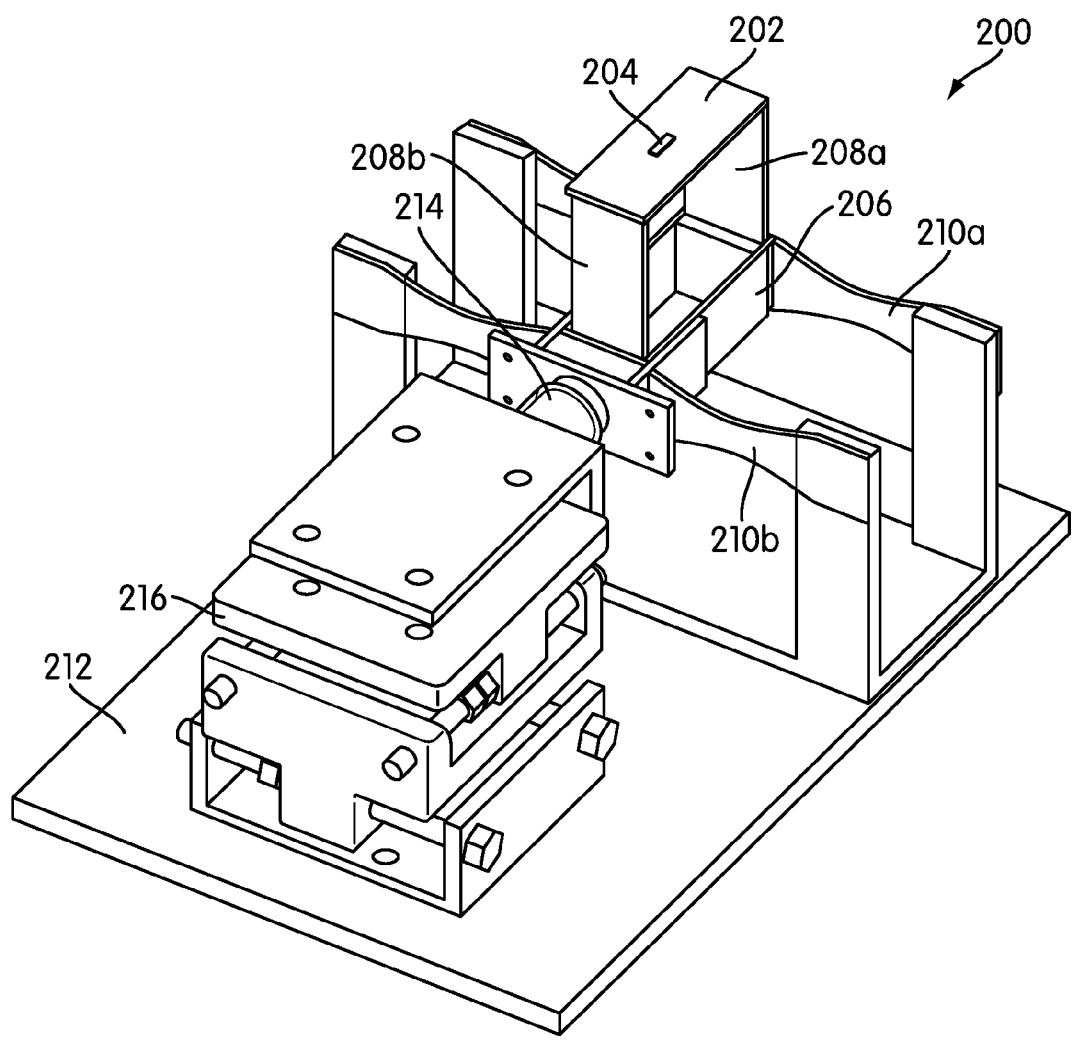
FIG. 8 is a schematic illustration of an acceleration device according to an alternative embodiment of the invention.
Figure 17:
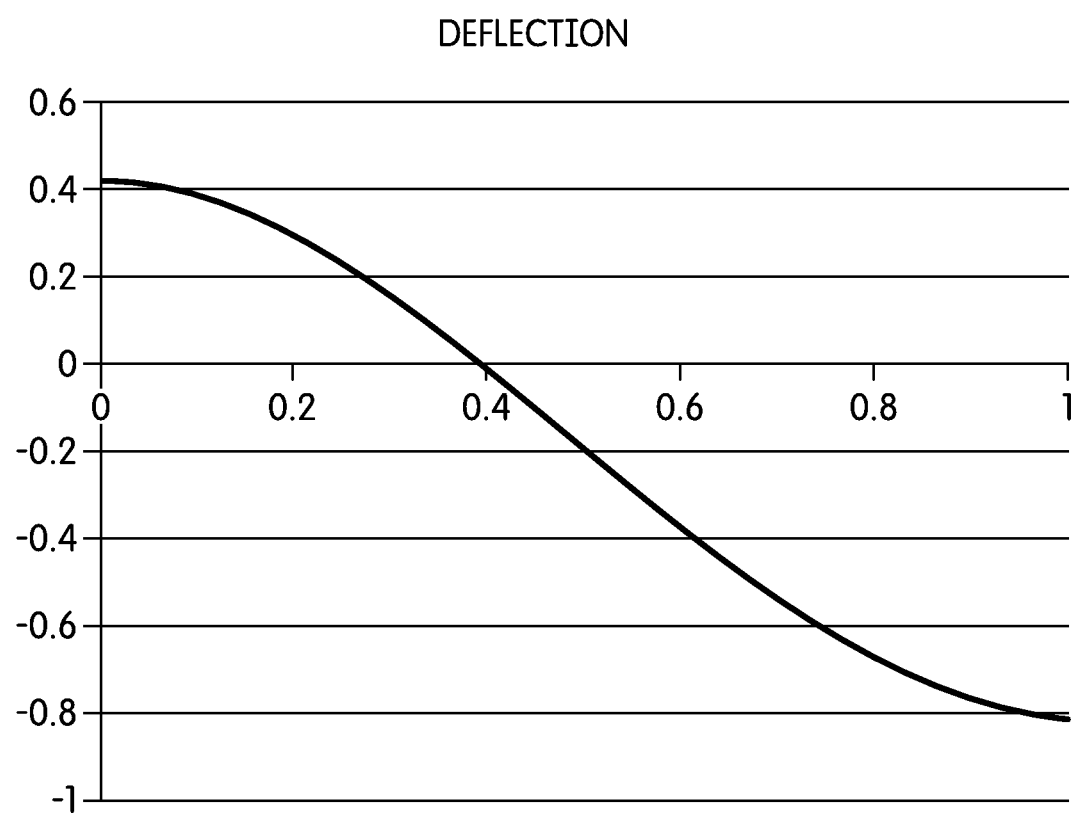
FIG. 17 is a graph showing the results of a numerical simulation of deflection of a flexure at a resonant mode where the horizontal-axis corresponds to normalized position of the flexure and the vertical axis corresponds to normalized deflection at the corresponding position along the flexure.

In contemplated embodiments, the environmental chamber surrounds the mass $m_2$, and the spring passes through an aperture in the environmental chamber. In some embodiments, such as those that use flexible beams (e.g., flexures 210a, 210b as shown in FIG. 8) as the spring, the aperture is positioned over the flexible beams where the deflection of the flexible beams is approximately zero during a target resonant mode. Referring to FIG. 17, a plot of deflection of a flexure shows the nodal point without deflection during a resonant mode, where a wall of the chamber may be placed over the nodal point for enclosing the DUT(s) in the chamber. According to the theoretical example, the calculated deflection has one end at 0.420 and the other at −0.805.

In contemplated embodiments, the spring member deflects lengthwise, such as axial deflection of an elastic beam. The environmental chamber surrounding only the mass $m_2$ includes an aperture through which the spring member extends to the mass $m_2$. The aperture is sized to have a tight tolerance around the beam, to contain the space between the aperture and the beam. The aperture may further include a low-friction bearing designed to reduce friction between the beam and the aperture. In other contemplated embodiments, other environmental chamber configurations are used to surround only the mass $m_2$. In still other contemplated embodiments, a larger environmental chamber is used to surround both the mass $m_1$ and mass $m_2$, but not the motor. A gasket may be used between the aperture of the environmental chamber and the output shaft of the motor. And in yet other contemplated embodiments, no environmental chamber is used, or the environmental chamber surrounds the entire system.

Still referring to FIG. 3, in an ideal case, it would be advantageous to have $k_1$, the spring rate of the spring between the fixed body and mass $m_1$, be as close to zero as possible (e.g., not attached), but in practice such an assembly may drift.

Figure 4:
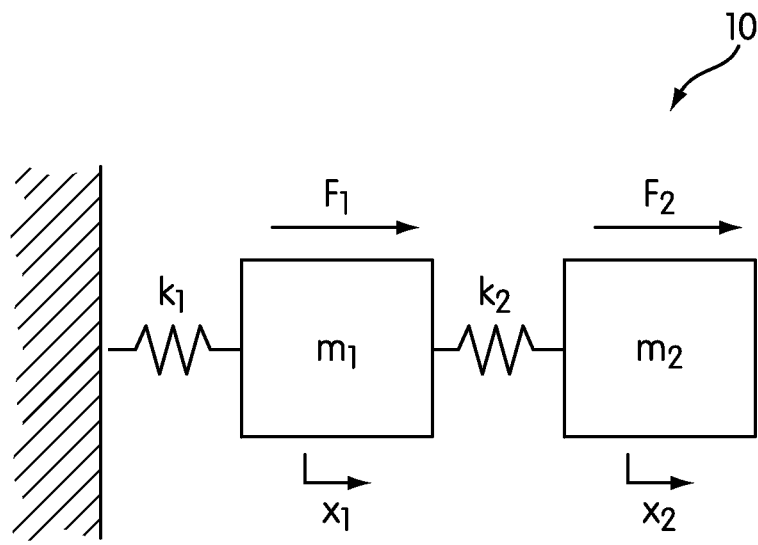
FIG. 4 is an alternate representation of the system of FIG. 3.

FIG. 4 presents a still further simplified illustration of the system of FIG. 3. The text entitled Theory of Vibration with Applications, second edition by William T. Thomson, section 5.3 entitled Forced Harmonic Vibration, incorporated herein by reference, provides information for vibration of a system having two masses connected by springs, although not identical to the system of FIG. 4. The equations of motion for the system of FIG. 4 are as follows, which may be used to solve for the mode shapes:

$$m_1 \ddot{x}_1 = F_1 + k_2(x_2 - x_1) - k_1 x_1 \tag{Eq. 5}$$

$$m_2 \ddot{x}_2 = F_2 + k_2(x_1 - x_2) \tag{Eq. 6}$$

where subscripts denote the structures labeled in FIG. 4, and which in may be rewritten in matrix form, as:

$$\begin{bmatrix} F_1 \\ F_2 \end{bmatrix} = \begin{bmatrix} m_1 & 0 \\ 0 & m_2 \end{bmatrix} \begin{bmatrix} \ddot{x}_1 \\ \ddot{x}_2 \end{bmatrix} + \begin{bmatrix} k_1+k_2 & -k_2 \\ -k_2 & k_1 \end{bmatrix} \begin{bmatrix} x_1 \\ x_2 \end{bmatrix} \tag{Eq. 7}$$

To find the natural frequencies and eigenvectors of such a system, harmonic motion is assumed where $\ddot{x} = \omega^2 x$, and Equation 7 may be presented as homogeneous second-order linear differential equations (e.g, in free vibration, without driving forces $F_1$, $F_2$):

$$\begin{bmatrix} (k_1+k_2) - m_1 \omega^2 & -k_2 \\ -k_2 & k_1 - m_2 \omega^2 \end{bmatrix} \begin{bmatrix} x_1 \\ x_2 \end{bmatrix} = \begin{bmatrix} 0 \\ 0 \end{bmatrix} \tag{Eq. 8}$$

where, if the determinant of the matrix equals zero (zero driving forces $F_1$, $F_2$), this equation has two roots:

$$\omega_{1,2}^2 = \frac{(k_1+k_2)m_2 + k_2 m_1}{2 m_1 m_2} \pm \sqrt{\left(\frac{(k_1+k_2)m_2 + k_2 m_1}{2 m_1 m_2}\right)^2 - \frac{k_1 k_2}{m_1 m_2}} \tag{Eq. 9}$$

If $$\alpha = \frac{k_1}{k_2} \text{ and } \beta = \frac{m_1}{m_2}$$

then Equation 9 yields:

$$\omega_{1,2}^2 = \frac{k_2}{m_2}\left(\frac{(1+\alpha+\beta)}{2\beta} \pm \sqrt{\left(\frac{(1+\alpha+\beta)}{2\beta}\right)^2 - \frac{\alpha}{\beta}}\right) \tag{Eq. 10}$$

Note that there are two natural frequencies $\omega_1$ and $\omega_2$, where $\omega_1$ is greater than $\omega_2$.

The following equation may be used to solve for the spring rate $k_2$ corresponding to the natural frequency $\omega_1$:

$$k_2 = \frac{m_2 \omega_1^2}{\left(\frac{(1+\alpha+\beta)}{2\beta} + \sqrt{\frac{(1+\alpha+\beta)^2}{2\beta} - \frac{\alpha}{\beta}}\right)} \tag{Eq. 11}$$

The eigenvectors (mode shapes, ratio of $m_1$ displacement to $m_2$ displacement) associated with each frequency can be defined from Equation 8:

$$((k_1+k_2) - m_1 \omega_i^2) x_1 - k_2 x_2 = 0, \tag{Eq. 12}$$

which may also be written as:

$$\left(\frac{x_2}{x_1}\right)_i = \frac{(1+\alpha)k_2 - \beta m_2 \omega^2}{k_2}$$

In order to later define the amplitude in the damping matrix, the vectors are normalized with respect to the mass matrix:

$$\begin{bmatrix} (x_1)_1 & (x_2)_1 \\ (x_1)_2 & (x_2)_2 \end{bmatrix} \begin{bmatrix} m_1 & 0 \\ 0 & m_2 \end{bmatrix} \begin{bmatrix} (x_1)_1 & (x_1)_2 \\ (x_2)_1 & (x_2)_2 \end{bmatrix} = \begin{bmatrix} 1 & 0 \\ 0 & 1 \end{bmatrix} \tag{Eq. 12}$$

Using equations (11) and (12) yields:

$$(x_1)_i = \frac{1}{\sqrt{m_2\left(\beta + \left(\frac{x_2}{x_1}\right)_i^2\right)}} \tag{Eq. 13}$$

Figure 5:
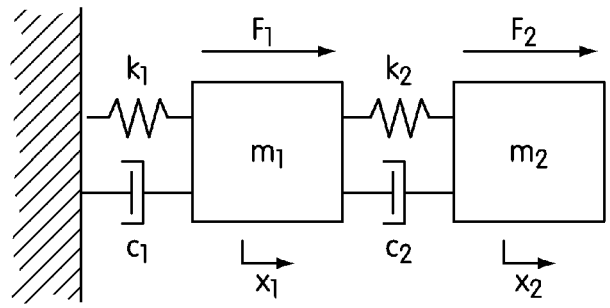
FIG. 5 is a representation of the system of FIG. 4, further including damping.

FIG. 5 represents the same system but taking into account damping. Assuming that the damping matrix is proportional to the stiffness matrix (i.e., $C \propto K$), the equations of motion are defined as:

$$\begin{bmatrix} m_1 & 0 \\ 0 & m_2 \end{bmatrix} \begin{bmatrix} \ddot{x}_1 \\ \ddot{x}_2 \end{bmatrix} + \begin{bmatrix} c_1+c_2 & -c_2 \\ -c_2 & c_2 \end{bmatrix} \begin{bmatrix} \dot{x}_1 \\ \dot{x}_2 \end{bmatrix} + \begin{bmatrix} k_1+k_2 & -k_2 \\ -k_2 & k_2 \end{bmatrix} \begin{bmatrix} x_1 \\ x_2 \end{bmatrix} = \begin{bmatrix} F_1 \\ F_2 \end{bmatrix} \tag{Eq. 14}$$

Defining a damping value $\zeta$ for the first mode (at $\omega_1$), one can use the normalized vector for that mode and can solve the following:

$$\begin{bmatrix} (x_1)_1 & (x_2)_1 \end{bmatrix} \begin{bmatrix} (1+\alpha)c_2 & -c_2 \\ -c_2 & c_2 \end{bmatrix} \begin{bmatrix} (x_1)_1 \\ (x_2)_1 \end{bmatrix} = 2\zeta \omega_1 \tag{Eq. 15}$$

which yields:

$$2\zeta \omega_1 = (x_1)_1^2 \left(1 + \alpha - 2\left(\frac{x_2}{x_1}\right)_1 + \left(\frac{x_2}{x_1}\right)_1^2\right) c_2 \tag{Eq. 16}$$

which may also be written as:

$$c_2 = \frac{2\zeta \omega_1}{(x_1)_1^2\left(1 + \alpha - 2\left(\frac{x_2}{x_1}\right)_1 + \left(\frac{x_2}{x_1}\right)_1^2\right)}$$

Numerically, the equations from the matrix of equation (14) can be solved as:

$$\ddot{x}_1 = \frac{F_1 - (c_1+c_2)\dot{x}_1 + c_2 \dot{x}_2 - (k_1+k_2)x_1 + k_2 x_2}{m_1} \text{ and } \tag{Eq. 17}$$

$$\ddot{x}_2 = \frac{F_2 + c_2 \dot{x}_1 - c_2 \dot{x}_2 + k_2 x_1 - k_2 x_2}{m_2}$$

Provided the following assumptions f=100 Hz (or $\omega_1$=628.3 rad/s), $m_2$=1 kg, $\beta$=2.0, $\alpha$=0.125, and $\zeta$=0.05, $k_2$=259,484 N/m, $k_1$=32,436 N/m, $m_1$=2 kg, $\omega_2$=103.2 rad/s (16.43 Hz.), the above equations yield the normalized vector at $\omega_1$=628.3 rad/s of:

$$\begin{bmatrix} x_2 \\ x_1 \end{bmatrix}_1 = \begin{bmatrix} -0.805 \\ 0.420 \end{bmatrix}$$

and the normalized vector at $\omega_2$=103.2 rad/s (16.43 Hz.):

$$\begin{bmatrix} x_2 \\ x_1 \end{bmatrix}_2 = \begin{bmatrix} 0.593 \\ 0.569 \end{bmatrix}$$

which correspond to the two resonant mode shapes.

Note that in the first vector, corresponding to $\omega_1$, the motion for $x_2$ is out of phase with that of $x_1$ and the amplitude of $x_2$ is almost double that of $x_1$, while in the second vector, corresponding to $\omega_2$, the motion for $x_1$ and $x_2$ are in phase with one another. This allows one to apply an excitation force to achieve the mode of vibration associated with $\omega_1$ without exciting the mode associated with $\omega_2$. According to an exemplary embodiment, the force at $m_1$ is defined to be in the opposite direction of the velocity of $m_2$, such that:

$F_1 = 470$ N if $\dot{x}_2 \leq 0$, $F_1 = -470$ N if $\dot{x}_2 > 0$, and $F_2 = 0$, for $\zeta$=0.05, $c_2$=41.3 (Ns/m), and $c_1$=5.16 (Ns/m).

Figure 6:
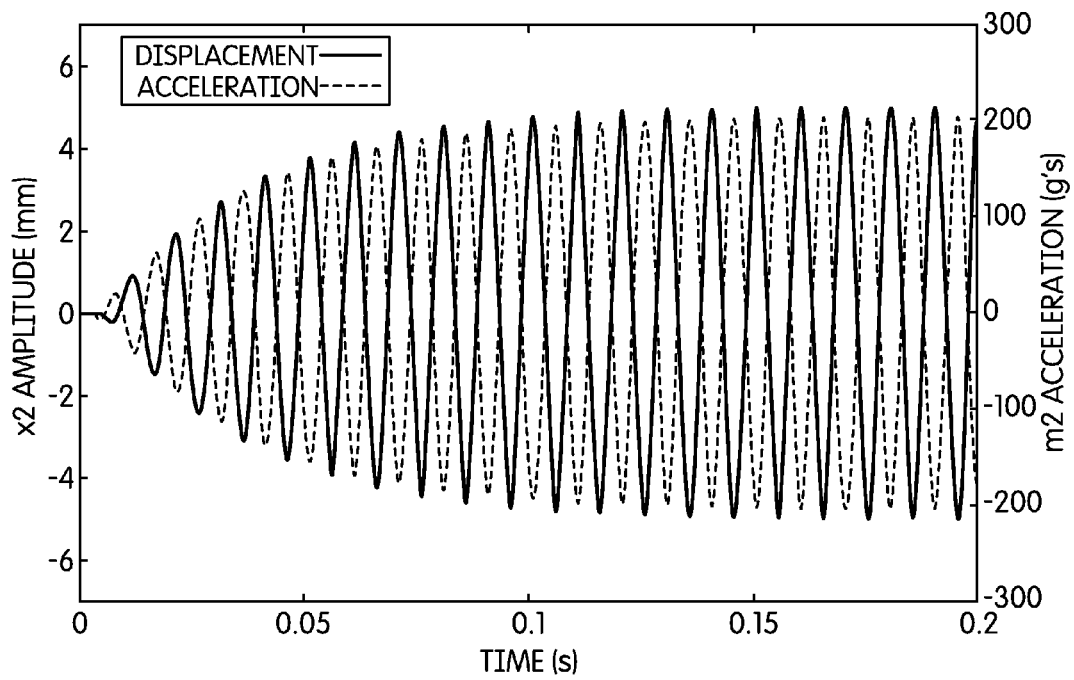
FIG. 6 is a graph showing the results of a numerical simulation of the system of FIG. 5 at resonance.

The results for this simulation are shown in FIG. 6 and indicate the ability of the simplified system of FIG. 5 to, in theory, excite a first mass, such as a mass inside an environmental chamber, by applying a force to another mass, which may be a mass that is outside the environmental chamber, where the masses are coupled to each other by a spring. The excitation force is applied as a function of the velocity of the second mass to produce a resonant response. Depending upon the control algorithm, the function may include force applied at a constant or stepped magnitude in the direction of the velocity (or opposite thereto), force applied at a magnitude proportional (or inversely proportional) to the magnitude of the velocity, etc. (see, e.g., feedback loop of FIG. 15 and related text). In other contemplated embodiments, excitation force is applied to the first mass according to such a function to produce a resonant response, but where the function is of the velocity of the first mass, a combination of the velocities of the first and second masses, or is a function of another state (e.g., position, acceleration, rotation angle, etc.) of the first and/or second masses.

In various contemplated embodiments, the excitation force may be applied in a magnitude that is proportional to the magnitude of velocity, acceleration, or displacement. In other contemplated embodiments, the force may be of a constant magnitude applied discretely, at one or more intervals within each cycle in the direction of the velocity vector. In still other contemplated embodiments, the force may be applied in a sinusoidal manner, where the frequency is a function of the resonance frequency of the system.

Figure 7:
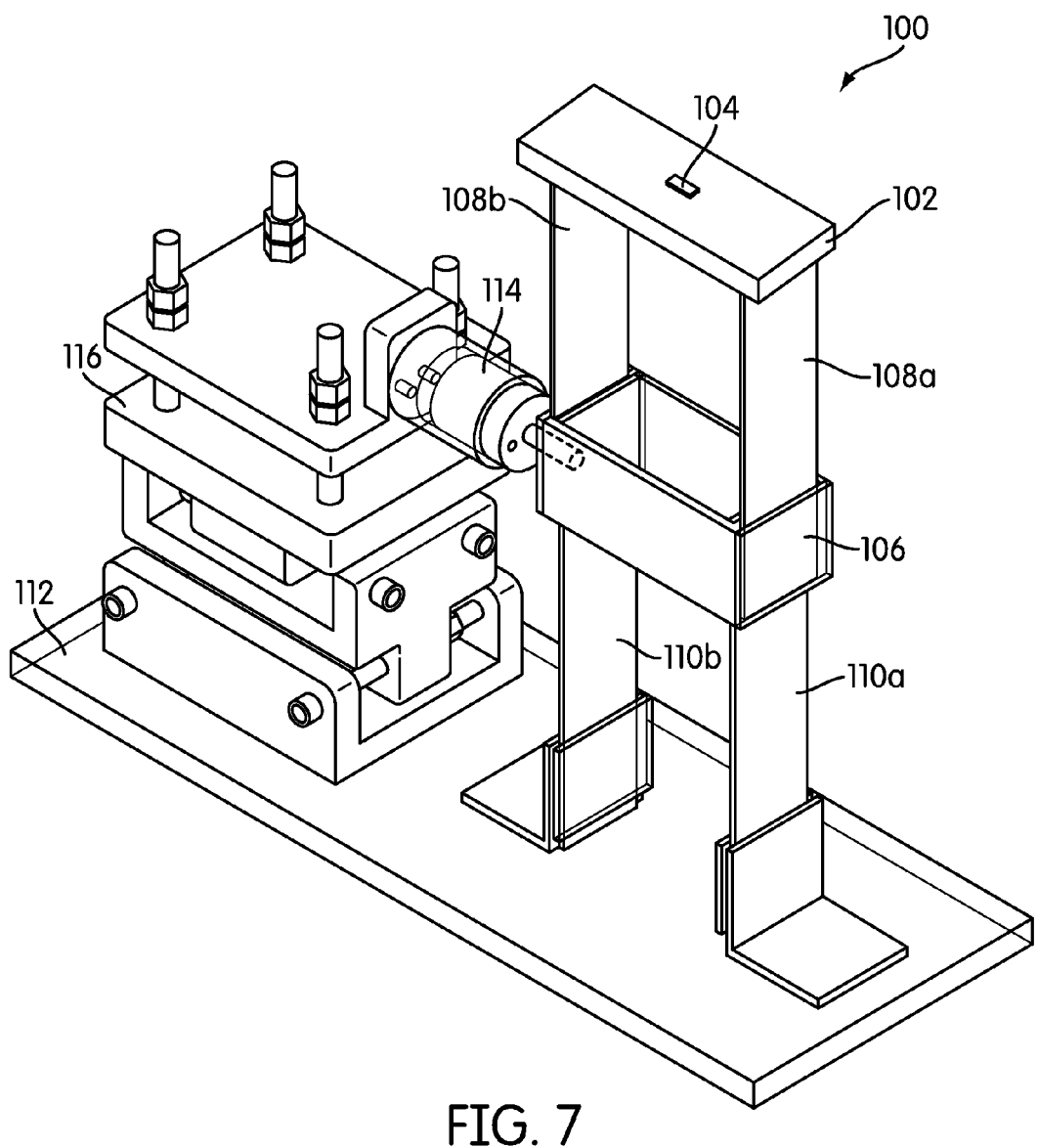
FIG. 7 is a schematic illustration of an acceleration device according to an embodiment of the invention.

Referring to FIG. 7, an acceleration device 100 (e.g., shaker), according to an embodiment of the invention includes a fixture 102 (e.g., support, tabletop) that receives a device 104 (e.g., DUT, MEMS accelerometer, micro-device) to be subjected to acceleration. It will be understood that in such an application, the device 104 may be connected electronically through a socket with a test unit, with or without wires. Further, while not shown in this simplified drawing, the fixture 102 and device 104 may be contained within an environmental chamber (see, e.g., environmental chamber as shown in FIG. 3) of a handler device. The handler device may be used to place the device 104 within the chamber and remove the device 104 after testing.

According to at least one embodiment of the invention, the fixture 102 is connected to a mass 106 by a pair of flexures 108a and 108b. The flexures 108a and 108b may comprise any suitable material that allows reciprocating movement within a desired frequency range. In one embodiment, 1095-tempered steel has been employed with a Young's modulus of 207 Gpa and each flexure with a spring rate ($k_2$) of 66,060 N/m. The combined flexures 108a and 108b allow motion in a single direction (positive and negative).

In this example, the mass 106 is coupled to a fixed mounting platform 112 via a second pair of flexures 110a and 110b. These flexures may also comprise a suitable material that allows reciprocating movement within a desired frequency range. In the above-noted example, the lower flexures utilized the same material (tempered steel) but with a substantially lower spring rate ($k_1$) of 7,484 N/m. In other contemplated embodiments, the lower flexures are removed, and the mass 106 moves on a platform. Rollers or bearings in tracks may be used to reduce frictional losses while still precisely constraining the movement of the mass 106 to prevent drifting.

According to an exemplary embodiment, an actuator is used to apply a driving force to the mass 106 so that the mass 106 moves in a reciprocating motion (e.g., oscillatory motion, periodic motion, harmonic motion). In this example, the actuator comprises a bearing-less motor, such as voice coil motor 114. In some such embodiments, the motor armature (i.e., the coil) is attached to the mass 106. The motor housing contains a magnet attached to an adjustable x-y stage (e.g., in this case adjusts in the y and z directions) so that the axis of the motor 114 housing may be aligned with the axis of the coil.

In operation, a device 104 to be tested is affixed to the fixture 102. The device 104 may be placed by hand or with an automated handler system. The fixture 102 may be contained within an environmental chamber as noted above.

In the example shown in FIG. 7, a periodic current is generated through the coil by application of a periodic signal, such as a sinusoidal signal. This may be configured to result in reciprocating movement of the mass 106 with a first frequency. This motion results in a force being applied through the flexures 108a and 108b on the fixture 102. As a result, the fixture 102 is also displaced with the first frequency but out of phase with mass 106, similar to the example provided with regard to FIG. 5, which includes the mode as described by:

$$\begin{bmatrix} x_2 \\ x_1 \end{bmatrix}_1 = \begin{bmatrix} -0.805 \\ 0.420 \end{bmatrix}$$

Use of the theoretical model may provide an approximation of the resonant frequency, and the frequency of the applied signal may then be adjusted to determine the resonant frequency of the real-world system, at which the displacement magnitude of the fixture is at a maximum. Additional devices, such as those of similar mass and geometry to the device 104, may be subjected to acceleration at the same frequency.

It will be understood that variations in operating conditions may result in a change in the resonant frequency. For example, temperature changes may affect the length or stiffness of the flexures. Calibration may be achieved by monitoring the displacement of the fixture and adjusting the frequency of the applied signal. In some embodiments, calibration may be conducted by human operators of the system. Masses of a system may change with different types or numbers of DUTs.

According to a contemplated embodiment, a resonant frequency of the test system may be determined by an automated tuning algorithm of the system that iterates by changing the driving frequency of the actuator, and using a numerical method (e.g., bisection method, Newton's method, secant method) to find the frequency corresponding to the maximum displacement, or to another parameter indicative of a resonance frequency (e.g., minimal input energy required to achieve a steady state response profile). Prior determinations of a resonant frequency as well as theoretical computations (e.g., model of FIG. 5) may be used as a starting point or to guide the automated tuning process.

FIG. 8 illustrates an acceleration system 200 according to an alternative embodiment of the invention. In this system, a fixture 202 and device 204 are attached to a mass 206 via flexures 208a and 208b. The mass 206 is attached to a fixed reference via lower flexures 210a and 210b. Portions of the lower flexures 210a and 210b have an hourglass shape, which may optimize stress distributions in the flexures 210a and 210b. An actuator comprising a bearing-less motor applies a periodic force to the mass 206. This configuration has a lower vertical profile and may be used advantageously in connection with a handler system.

It will be appreciated that while embodiments illustrated in FIGS. 7-8 include an x-y stage to facilitate alignment of the actuator, it may be unnecessary to include such a component.

Figure 9:
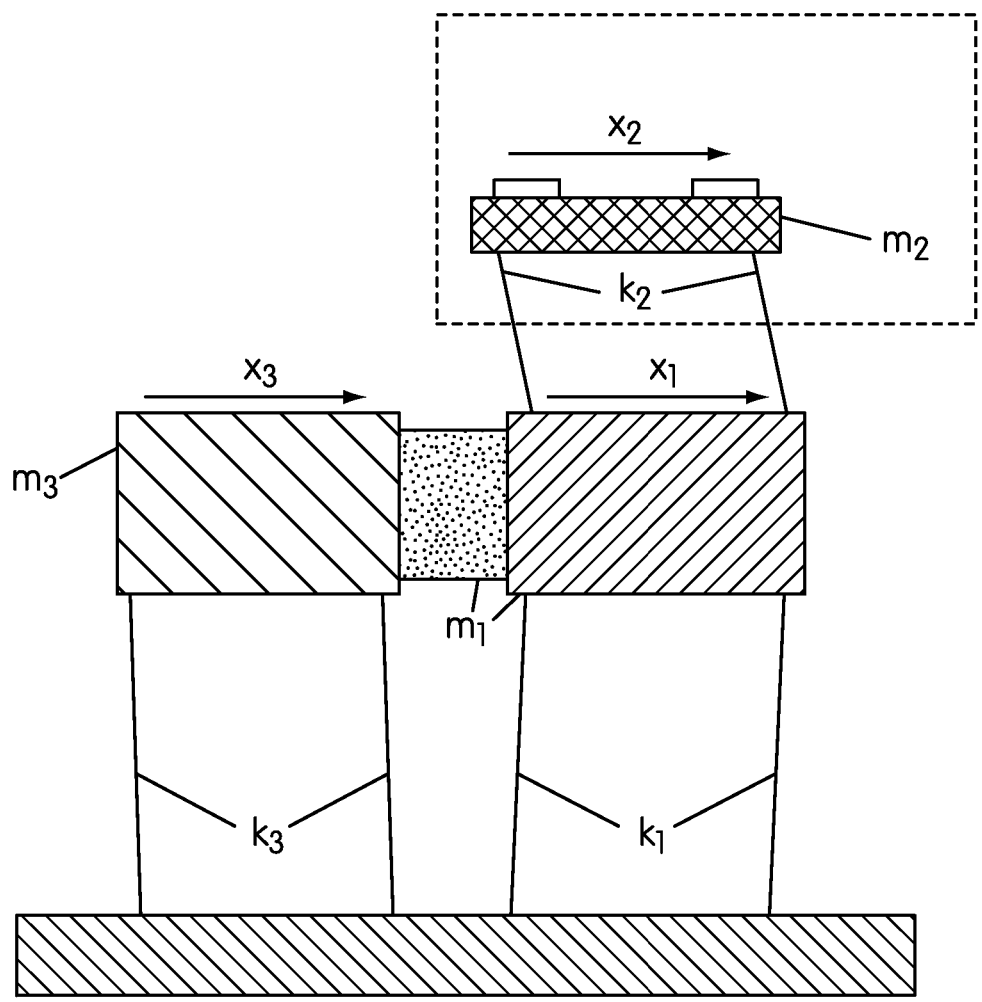
FIG. 9 illustrates yet another embodiment of an acceleration device according to the invention.

FIG. 9 illustrates another embodiment in which no x-y stage is required. In this embodiment, a fixture and a device, together constituting a mass $m_2$, are attached to a mass $m_1$ via a pair of flexures with a spring constant $k_2$. The mass $m_1$ is attached to a fixed reference (base) via lower flexures with a spring constant $k_1$. A third mass $m_3$ is attached to the fixed reference via a third pair of flexures with a spring constant $k_3$. In this embodiment, the motor depicted as mass $m_3$ applies a force to $m_1$, which results in oscillation of the fixture and device. Here, the spring constant $k_3$ and $m_3$ would be selected to result in a relatively small value of displacement $x_3$, and little transmissibility to the base. As illustrated in dashed lines, the mass $m_2$ may be positioned within an environmental chamber. The text entitled Theory of Vibration with Applications, second edition by William T. Thomson, section 3.6 entitled Vibration Isolation, incorporated herein by reference, provides information for regarding transmissibility.

The spring rate k for an isotropic flexure of constant cross-section is believed to be approximately twelve times the product of the modulus of elasticity for the material of the flexure and the moment of inertia of the cross-sectional area of the flexure, divided by the length of the flexure cubed. As such, the stiffness of the flexure may be adjusted by changing the length of the flexure. According to a contemplated embodiment, the resonant frequency of a system disclosed herein may be adjusted by sliding the flexure(s) relative to a fastening point to change the effective length of the flexure(s). The resonant frequency can be tuned to a desired frequency for testing a given DUT.

It will be understood that other variations are possible. For example, wireless communication may be used in place of wired connections between the device in the test fixture and the test device. Alternatively, test data may be recorded and stored on the fixture during testing, then subsequently received by a computer for analysis following a test. In some contemplated embodiments, the DUT may have more than one accelerometer incorporated in it. For example, a 3-axis accelerometer may have three sensors that are measuring accelerations along axes that are orthogonal from each other. It may be desirable to subject the DUT to stimulation such that two or more of these accelerometers are tested simultaneously. This may be accomplished by attaching a second actuator to a system oriented orthogonally to the first actuator, and by using a spring member (e.g., flexible rod(s)) that is able to flex in multiple directions. Another method of exciting multiple accelerometers on the DUT is to mount the DUT with the axes of the DUT set at angles to the motion of the platform on which it is mounted. For example, if the DUT is to be equally excited in two axes, the DUT is mounted with a rotation of 45° with respect to the motion of the platform, resulting in an excitation magnitude of 0.707 times the original excitation in two axes. This methodology can be extended for excitation in three axes.

Figure 10:
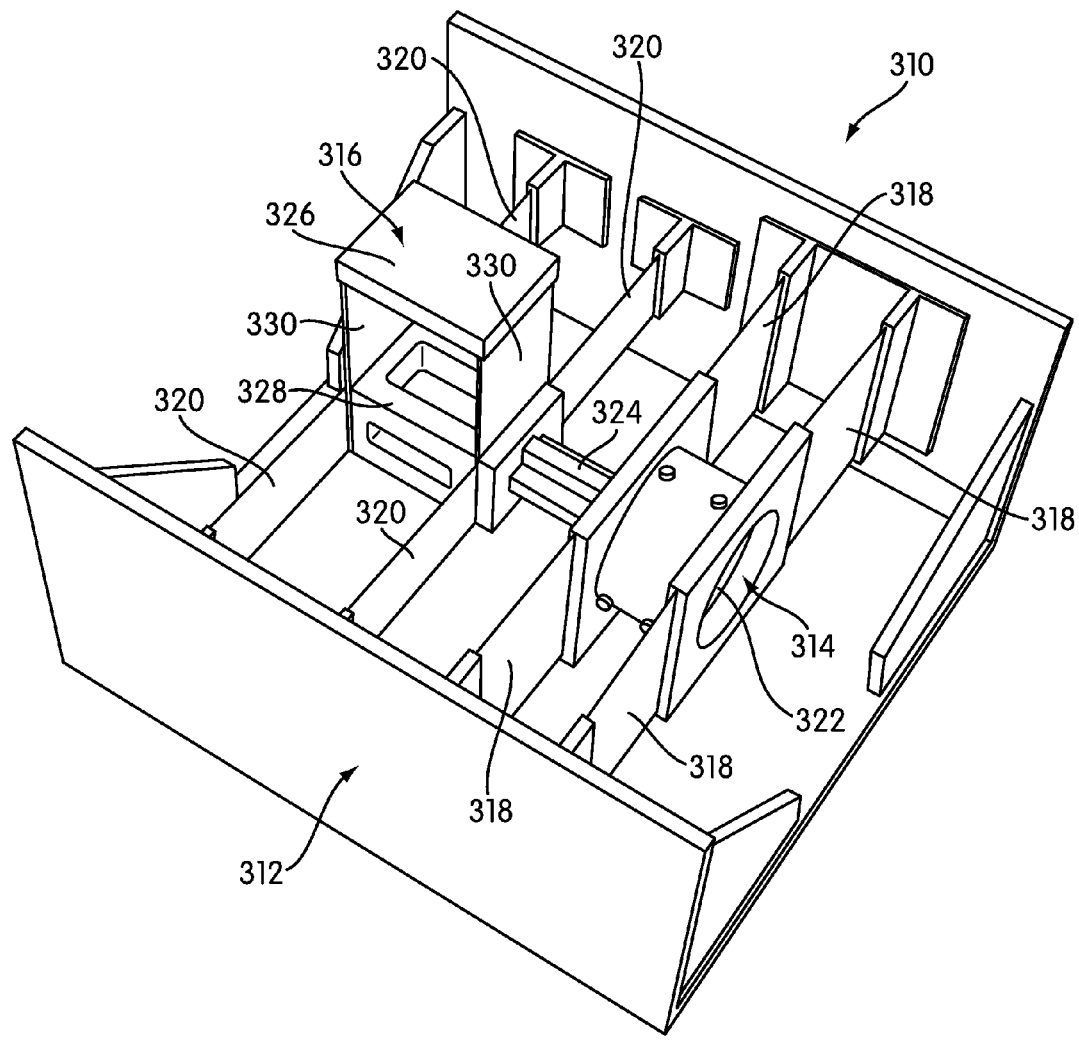
FIG. 10 is a perspective view of an acceleration device according to an exemplary embodiment of the invention.

Referring now to FIG. 10, an acceleration device 310 includes a base assembly 312, an alignment assembly 314, and a mass assembly 316. The alignment assembly 314 and mass assembly 316 are fastened to the base assembly 312 by flexures 318, 320. According to an exemplary embodiment, the flexures 318 associated with the alignment assembly 314 are less stiff than the flexures 320 associated with the mass assembly 316 to isolate the force induced from motor 322 to the base assembly 312. The alignment assembly 314 includes an actuator 322 configured to oscillate a shaft 324 extending between the alignment assembly 314 and the mass assembly 316. At the resonant frequency, the fixture 326 of the mass assembly 316 provides most of the motion in response to the force from the actuator 322.

According to an exemplary embodiment, the mass assembly 316 includes a fixture 326 (e.g., platform) mounted to a lower platform 328 by way of additional flexures 330. Oscillations of the lower platform 328 translate through the flexures 330 to the fixture 326, shaking the fixture 326. In some embodiments, the frequency of oscillation provided by the actuator 322 is tuned to induce a resonant response with a maximum amplitude in the motion of the fixture 326. Such a response induces the fixture 326 to accelerate at a much greater magnitude than the lower platform 328 of the mass assembly 316.

Figure 11:
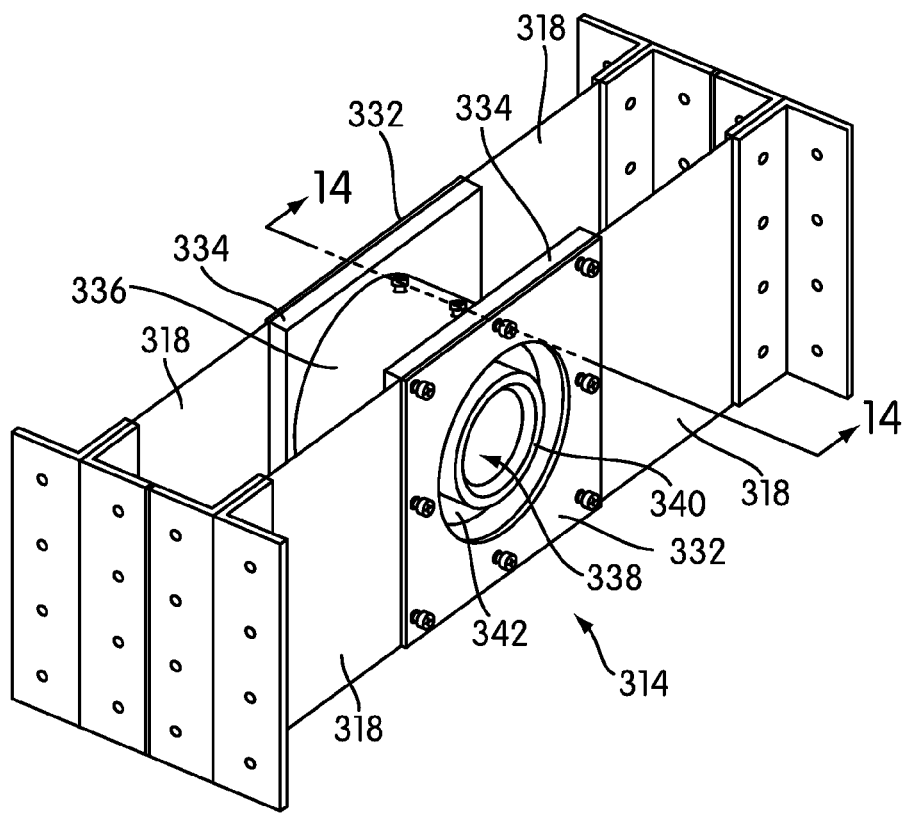
FIG. 11 is a perspective view of an actuator for the acceleration device of FIG. 10.
Figure 12:
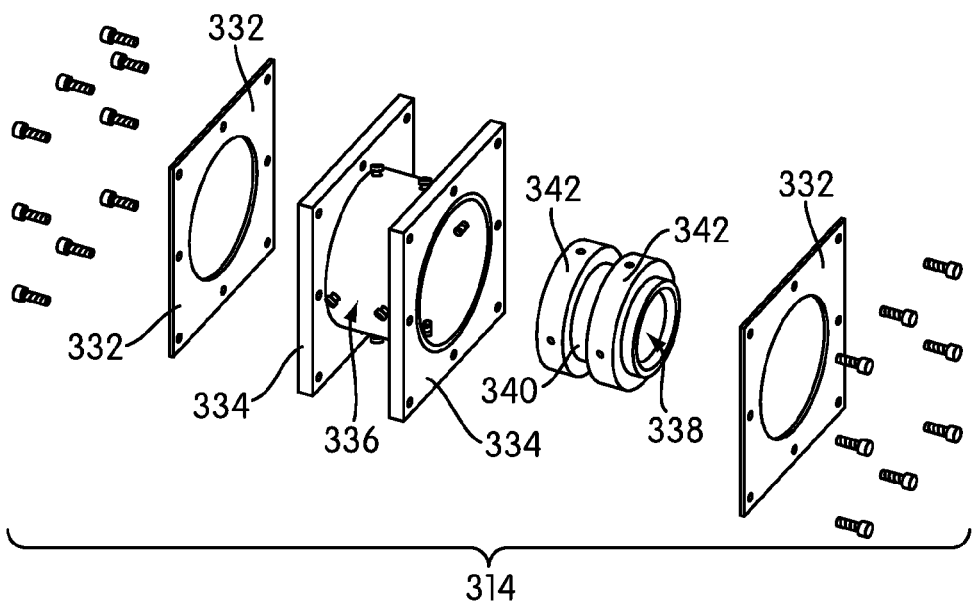
FIG. 12 is an exploded view of the actuator of FIG. 11.

Referring to FIGS. 11-12, the alignment assembly 314 includes a opposing face plates 332 that are fastened over the flexures 318 to plates 334 fastened to a cylinder 336. The plates 334 fastened to the cylinder 336 may be square, and may be welded to the cylinder 336. In other embodiments, otherwise shaped plates or other supports may be used. Within the cylinder 336, the alignment assembly 314 includes an actuator 338, which includes a magnet 340 (e.g., permanent magnet) with collars 342 (e.g., locking collar) and a voice coil 344 (FIG. 13).

Figure 13:
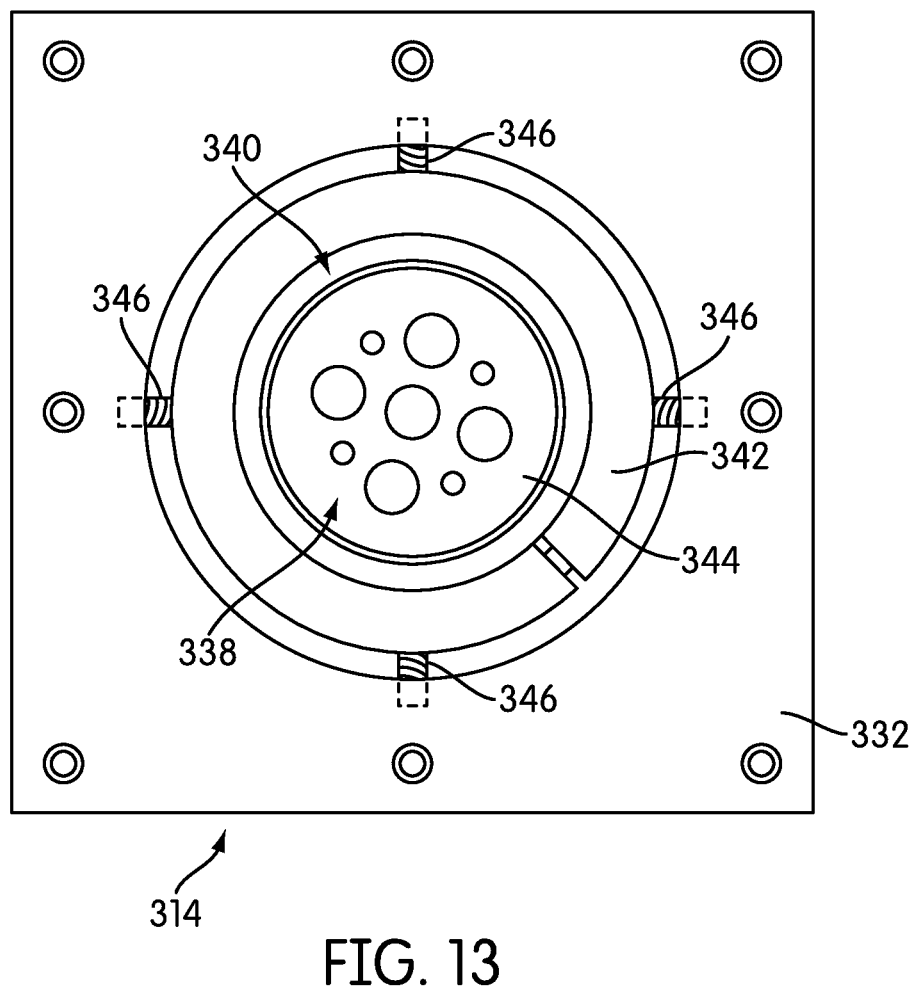
FIG. 13 is a front view of the actuator of FIG. 11.
Figure 14:
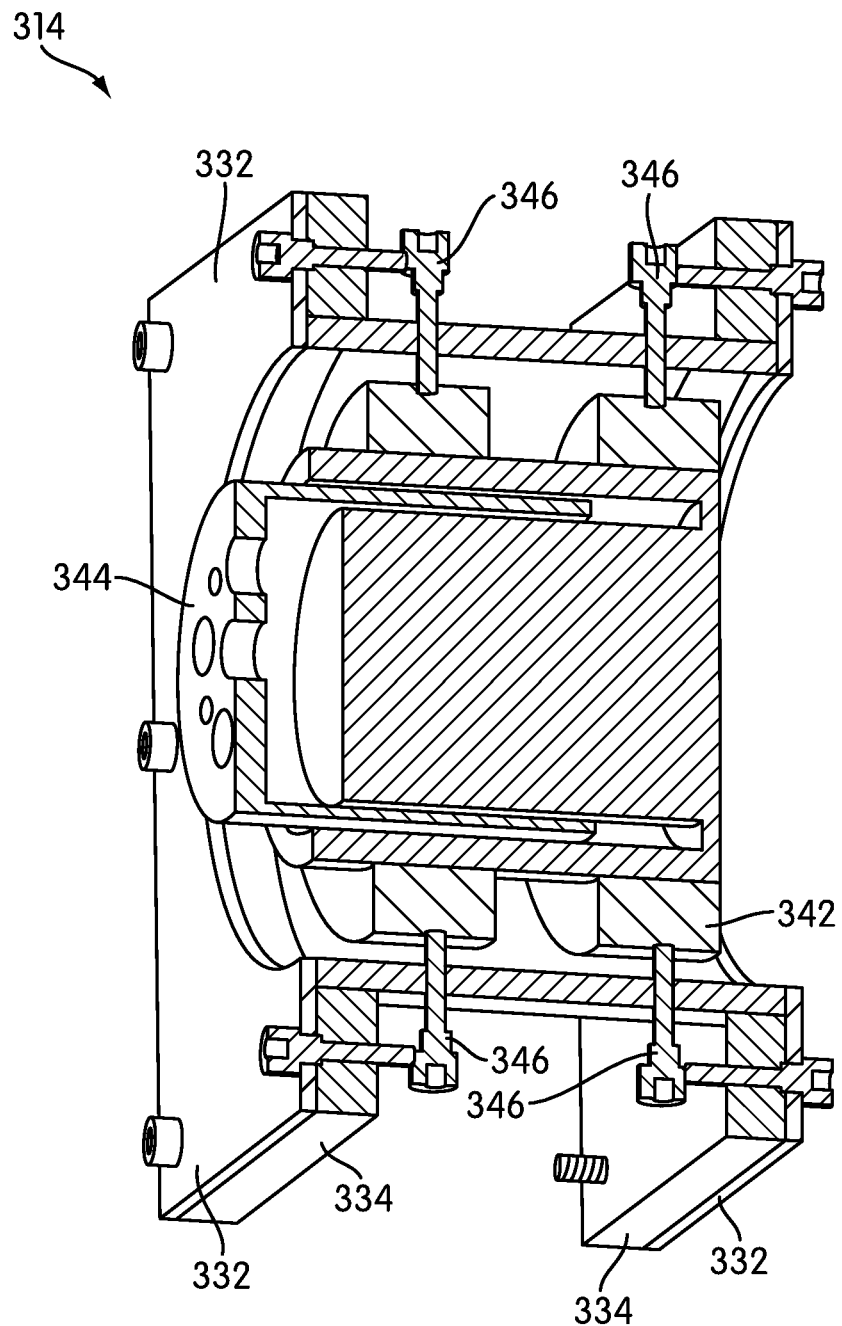
FIG. 14 is a sectional view of the actuator of FIG. 11 taken along line 14-14 shown in FIG. 11.

Referring to FIG. 13, the actuator 338 is integrated with the magnet 340 and the collars 342. According to an exemplary embodiment, the magnet 340 is configured to provide a field within which the voice coil 344 operates to apply force through the shaft 324 (FIG. 10) to the mass assembly 316. Referring to FIGS. 13-14, the alignment assembly 314 further includes an array of adjustment elements in the form of set screws 346. Fine tune adjustment (e.g., shimming) of the actuator may be accomplished by adjusting the screws 346 to move the collars 342, which in turn move the voice coil 344 to direct the force provided thereby in a desired direction. If movement of the DUT occurs in the x-direction, the voice coil may be aligned with the DUT with regard to translation and rotation about the y- and z-directions. Alignment prevents physical contact between magnet 340 and voice coil 344, in order to minimize damping (due to friction) and maximize displacement at resonance.

Figure 15:
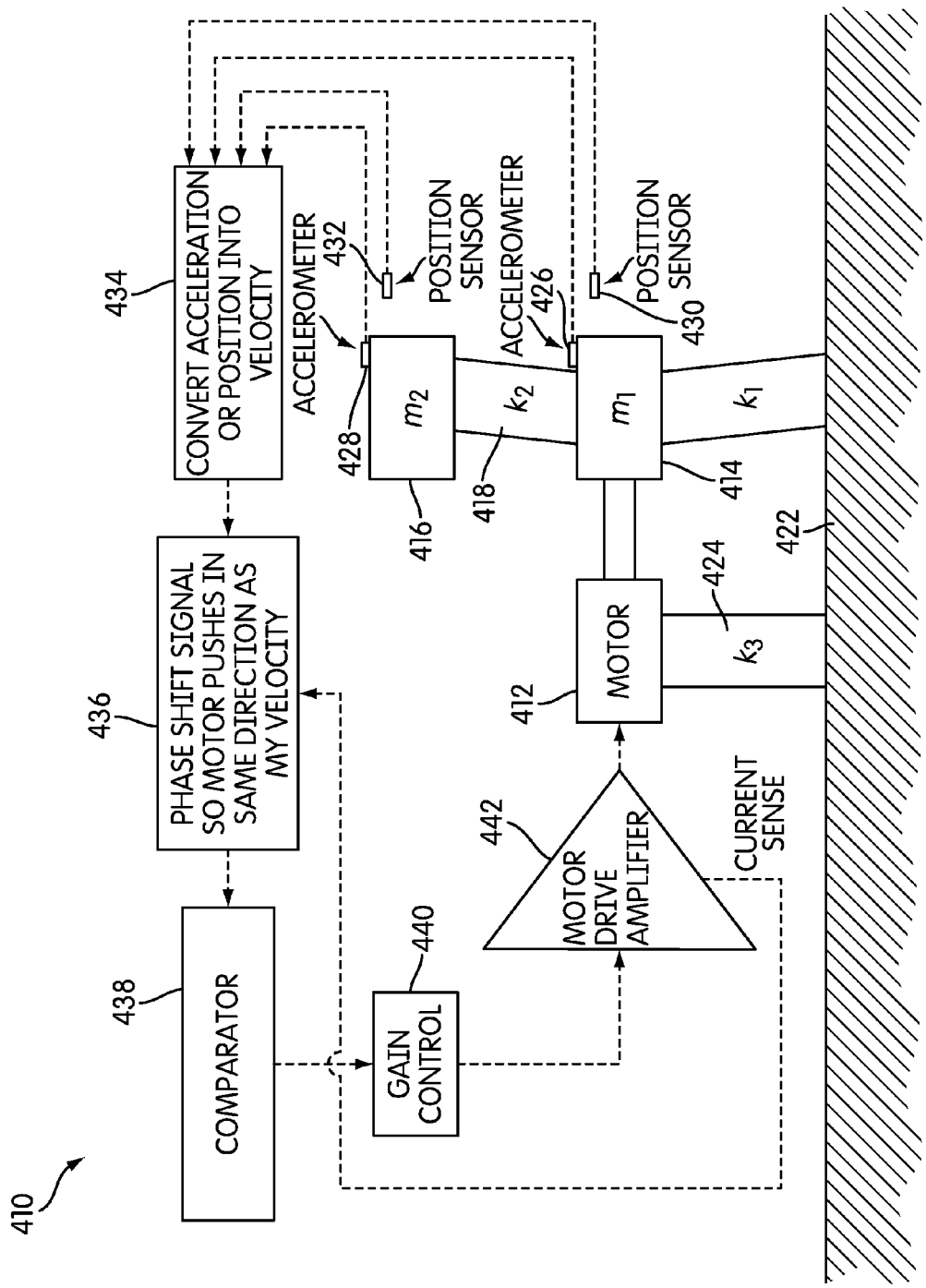
FIG. 15 is a schematic diagram of a feedback system for an acceleration device according to the invention.

Referring to FIG. 15, an acceleration device 410 (e.g., testing system) includes a motor 412 configured to oscillate a platform 414 of a mass $m_1$. Oscillation of the platform 414 of mass $m_1$ in turn oscillates a platform 416 of mass $m_2$. The response of the platforms 414, 416 to the loading provided by motor 412 is influenced by the stiffness $k_2$ of a spring 418 between the platforms 414, 416, the stiffness $k_1$ of a spring 420 between the platform 416 and a fixed surface 422, and the stiffness $k_3$ of a spring 424 between the motor 412 and the fixed surface 422.

Accelerometers 426, 428 coupled (either physically or otherwise) to the platforms 414, 416 provide signals associated with sensed accelerations of the respective platforms 414, 416. Alternatively or in addition thereto, other sensors, such as position sensors 430, 432 may be used to sense the position of the platforms 414, 416. Integration of the accelerations or differentiation of the positions with respect to time may be used by control circuitry 434 to provide (e.g., estimate, calculate) the velocity of the platform 416. In other contemplated embodiments, the sensors are used to provide the velocity of the platform 414. In some embodiments sensed positions or accelerations are used as feedback to operate to the motor 412 to apply force to influence the velocity of the platform 414 and/or the platform 416, where, for excitation of the resonant response, the force is applied in phase with the velocity of the platform 414 or opposite to that of the platform 416, and vice versa for braking.

The velocity of the platform 416, which may be in the form of an oscillating frequency, may then be shifted by a phase shift module 436 based on a signal provided to the motor 412 for operation thereof, so that the motor 412 pushes in the same direction as the velocity of the platform 414. The signal may then be provided to a comparator 438 to compare the signal to null. Output of the comparator 438, for example, may change polarity every time the signal passes zero from positive to negative velocity, and vice versa. From the comparator 438, the signal may then be adjusted with a gain control module 440 (e.g., automatic gain control) to adjust the signal strength as necessary to be received by the motor drive amplifier 442. The motor drive amplifier 442 then provides the control signal to the motor 412, and further provides the signal received by the phase shift module 436.

One versed in the art would appreciate that there may be other embodiments and modifications within the scope and spirit of the disclosure. Accordingly, all modifications attainable by one versed in the art from the present disclosure, within its scope and spirit, are to be included as further embodiments of the present disclosure. The scope of the following claims and their equivalents is intended to cover such embodiments, modifications, and alternative designs.

What is claimed is:

1. An acceleration system comprising:
an actuator configured to displace a mass in a reciprocating motion at a resonant frequency, wherein the actuator is configured to apply a force to the mass;
a mount configured to hold a device;
at least one flexure element connecting the mount to said mass; and
a phase shift module that controls the actuator such that, during excitation of the system, the force is applied only in a direction that is substantially the same as a direction of a velocity of the mass.

2. The acceleration system of claim 1, wherein the actuator comprises a voice coil motor.

3. The acceleration system of claim 2, wherein the voice coil motor includes a permanent magnet and an armature, and wherein said armature comprises part of said mass.

4. The acceleration system of claim 2, wherein the voice coil motor includes a permanent magnet and an armature, and wherein the permanent magnet is part of the mass.

5. The acceleration system of claim 1, wherein the mount includes a test socket to which the device is electrically connected.

6. The acceleration system of claim 5, wherein the device is an accelerometer device.

7. The acceleration system of claim 1, further comprising at least one additional flexure element connecting the mass to a fixed surface.

8. The acceleration system of claim 1, wherein the at least one flexure element comprises a pair of flexure elements.

9. The acceleration system of claim 1, further comprising a handler configured to connect and disconnect the device to and from the mount.

10. The acceleration system of claim 9, further comprising a chamber surrounding the mount, wherein the conditions within the chamber are controlled, the conditions including at least one of temperature and humidity.

11. The acceleration device of claim 1, wherein the actuator is configured to apply a sinusoidal force to said mass.

12. The acceleration system of claim 1, wherein the acceleration system has at least two resonant frequencies.

13. The acceleration system of claim 1, wherein the phase shift module controls the actuator such that, during braking of the system, the force is applied only in a direction that is substantially opposite to a direction of the velocity of the mass.

14. A method of accelerating a device comprising:
providing an acceleration system comprising a mount, a mass, at least one flexure element, and an actuator;
placing the device on the mount, said mount being coupled to said mass via the at least one flexure element; and
applying a force to the mass with the actuator to displace the mass in a reciprocating motion at a desired resonant frequency,
wherein during excitation of the system, the force is applied only in a direction that is substantially the same as a direction of a velocity of the mass.

15. The method of claim 14, wherein the actuator comprises a voice coil motor.

16. The method of claim 15 wherein the voice coil motor includes a permanent magnet and an armature and wherein said armature comprises part of said mass.

17. The method of claim 15, wherein the voice coil motor includes a permanent magnet and an armature, and wherein the permanent magnet is part of the mass.

18. The method of claim 14, wherein the mount includes a test socket, and placing the device includes electrically connecting the device to the test socket.

19. The method of claim 18, wherein the device is an accelerometer device.

20. The method of claim 14, wherein said mass is further coupled to a fixed surface via at least one additional flexure element.

21. The method of claim 14, wherein said at least one flexure element comprises a pair of flexure elements.

22. The method of claim 14, wherein said placing includes inserting the device into a test socket affixed to the mount with a handler device.

23. The method of claim 14, wherein said placing includes placing the device within a chamber surrounding the mount, and further comprising controlling the environmental conditions within the chamber, the conditions including at least one of temperature and humidity.

24. The method of claim 14, wherein said force applied to the mass is a sinusoidal force.

25. The method of claim 14, wherein the acceleration system has at least two resonant frequencies.

26. The method of claim 14, wherein, during braking of the system, the force is applied only in a direction that is substantially opposite to a direction of the velocity of the mass.

* * * * *